United States Patent [19]

Patzschke et al.

[11] Patent Number: 4,595,717

[45] Date of Patent: Jun. 17, 1986

[54] AQUEOUS ELECTRODIP LACQUER COATING COMPOUND CAPABLE OF BEING DEPOSITED AT THE CATHODE, AND ITS USE

[75] Inventors: Hans-Peter Patzschke; Armin Göbel; Klausjörg Klein, all of Wuppertal, Fed. Rep. of Germany

[73] Assignee: Herberts Gesellschaft mit beschraenkter Haftung, Wuppertal, Fed. Rep. of Germany

[21] Appl. No.: 656,356

[22] Filed: Oct. 1, 1984

[30] Foreign Application Priority Data

Oct. 8, 1983 [DE] Fed. Rep. of Germany ....... 3336749

[51] Int. Cl.$^4$ .................. C08G 59/14; C09D 3/49; C09D 5/40; C25D 13/04
[52] U.S. Cl. .................. 523/414; 523/417; 524/901
[58] Field of Search ............ 524/901; 523/414, 417

[56] References Cited

U.S. PATENT DOCUMENTS

| | | | |
|---|---|---|---|
| 4,373,059 | 2/1983 | Patzschke et al. | 524/761 |
| 4,384,946 | 5/1983 | Patzschke et al. | 523/414 |
| 4,430,462 | 2/1984 | Jaeger et al. | 523/402 |
| 4,454,264 | 6/1984 | Patzschke et al. | 523/414 |
| 4,476,261 | 10/1984 | Patzschke et al. | 523/402 |

FOREIGN PATENT DOCUMENTS 4090 12/1979 European Pat. Off. .

*Primary Examiner*—Ronald W. Griffin
*Attorney, Agent, or Firm*—Schwartz, Jeffery, Schwaab, Mack, Blumenthal & Evans

[57] ABSTRACT

Aqueous electrodip lacquer coating compound capable of being deposited cathodically, containing, as synthetic resin binder, (A) 55 to 95% by weight of synthetic resin binder which can be rendered water soluble by protonation with acid and (B) 5 to 45% by weight of a cross-linking agent containing ester groups capable of transesterification and/or transamidation and having terminal ester groups which are substantially stable in a neutral aqueous medium but capable of reacting with synthetic resin binder (A) in an alkaline medium at temperatures above 140° C., component (A) containing in its molecule at least one molecule-enlarging diamine of the formula

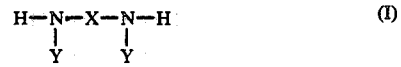

wherein the symbol Y stands for H or $C_mH_{2m+1}$ (m=1 to 8) or an organic group used for defunctionalization, which is formed by the reaction of the primary amino group with monoepoxides, and the symbol X represents a molecular grouping having at least one amide and/or urea group.

8 Claims, No Drawings

AQUEOUS ELECTRODIP LACQUER COATING COMPOUND CAPABLE OF BEING DEPOSITED AT THE CATHODE, AND ITS USE

This invention relates to an aqueous electrodip lacquer coating compound capable of being deposited at the cathode, containing pigments, fillers, corrosion inhibitors, lacquer auxiliaries, optionally catalysts and 20% by weight, based on the total weight of coating compound, of organic solvents and, as synthetic resin binder:

(A) 55 to 95% by weight, based on the total quantity of synthetic resin binder, of a synthetic resin binder containing hydroxyl groups and tertiary amino groups and optionally primary and/or secondary amino groups and having an average molar mass ($\overline{M}n$) of from 500 to 20,000, a $pK_b$ value of from 3 to 7, a hydroxyl number of from 50 to 400 and an amine number of from 30 to 150, which binder can be rendered water soluble by protonation with acid, and (B) 5 to 45% by weight of a cross-linking agent with an average molar mass ($\overline{M}n$) of from 350 to 5,000 containing ester groups capable of transesterification and/or transamidation and having an ester number of reactive terminal ester groups of from 30 to 500, preferably 100 to 250, the ester groups being substantially stable in neutral, aqueous media but capable of reacting with hydroxyl and primary and/or secondary amino groups of synthetic resin binder A in a basic medium at temperatures above 140° C.

The invention also relates to the use of this coating compound for the production of cathodically deposited coatings on electrically conductive substrates.

Electrodip lacquer coatings of the type described above are known in a modified form from EP-A-4090.

It is known that various organic binder systems dispersed in an aqueous medium by salt formation can be deposited electrophoretically on a conductive metal article dipped in the aqueous bath. As electrophoresis lacquers with high all-round grip and very high corrosion protection even on sheet metal which has not been phosphated there are nowadays used mainly binders which can be deposited at the cathode. They are prepared mainly from epoxide resins based on bisphenol A and amines or amino alcohols. Thermal cross-linking of these binders is carried out by various methods, e.g. by the incorporation of blocked isocyanates in the molecule (DE-A-20 57 799; DE-A-21 31 060; DE-A-22 52 536; DE-A-22 65 195; DE-A-23 63 074; DE-A-26 34 211) or by transamidation or transesterification processes (EP-A-00 4090; EP-A-012 463; EP-A-040 867; EP-A-066 859; EP-A-082 291: DE-A-31 03 642; DE-A-33 15 469).

Resin systems with blocked isocyanates generally have the disadvantage of being subject to considerable losses by stoving at the high curing temperatures required and of thereby polluting the environment. Low molecular weight alcohols such as methanol and ethanol cannot be used as masking agents because their urethanes are stable at temperatures below about 250° C. Although the cross-linking agents used for the transamidation and transesterification processes are subject to relatively little loss by decomposition, the binder systems have disadvantages which leave room for improvement, such as, for example, their adherence to adjacent layers, such as PVC layers or fillers, their elastic properties, and/or the increase in layer thickness.

It is an object of the present invention to find synthetic resin lacquers as basic resins and aqueous electrodip lacquer coating compounds which provide improvements with regard to the disadvantages described above.

The invention relates to the cathodically deposited aqueous electrodip lacquer coating compound capable of being deposited at the cathode as described in the Patent claims, and its use.

The basic resin (A) of the binder mixture is normally obtained from resins containing epoxide groups, preferably including terminal epoxide groups, selected from polyglycidyl ethers, polyglycidyl esters and polyglycidyl amines, by their reaction with secondary and primary amines. In addition to the alkyl group, these may be modified with at least one primary or secondary hydroxyl group, a dialkyl amino group or a primary amino group which is temporarily protected by ketimine formation.

The basic resin (A) may in addition be modified with polycarboxylic acids or polyalcohols to lower the amine number. Examples of suitable aliphatic, cycloaliphatic and/or aromatic polycarboxylic acids with different chain lengths include adipic acid, sebacic acid, isophthalic acid and dimeric fatty acids. The hydroxyl-containing compounds used may be low molecular weight polyols such as neopentyl glycol, bis-ethoxylated neopentyl glycol, the neopentyl glycol ester of hydropivalic acid, hexanediol-(1,6), bis-(hydroxymethyl)cyclohexane, 1.1-isopropylidene-bis(p-phenoxy)-2-propanol as well as polyglycol ethers, polyester polyols, polyether polyols, polycaprolactone polyols or polycaprolactam polyols of various functionalities and molecular weights.

By polyglycidyl ethers within the context of this invention are understood preferably those polyglycidyl ethers which correspond to the following general formula:

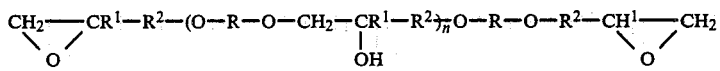

wherein

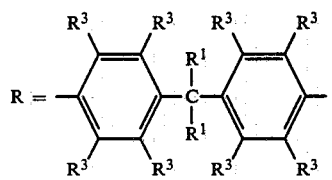

$R^1$=H or $C_mH_{2m+1}$
$R^2=(CR_2^1)_m$, preferably $CH_2$
$R^3=R^1$, halogen or preferably H
$n=0$ to 6
$m=1$ to 8

The numerical average of the molar mass of these polyglycidyl ethers is about 340 to 5,000 and these compounds accordingly have an epoxide equivalent weight of from 170 to 2,500. The epoxy resins may be used in a hydrogenated or partly hydrogenated form or as mixtures with different structures and molar masses.

The following may be used in known manner as compounds containing amino groups: dialkylamines such as diethylamine or ethylhexylamine, dialkanolamines such as diethanolamine, diisopropanolamine or N-methylethanolamine. The resins containing epoxide groups may also be reacted with ketimines or aldimines containing amino and/or hydroxyl groups in order to introduce primary or secondary amino groups into the basic organic resin (A). The preferred ketimines are reaction products of ketones and alkylamines containing secondary amino groups, corresponding to the general structural formula $R^1-NH-R^2-NH^2$.

When primary amines such as octylamine, monoethanolamine, dimethylaminopropylamine, dimethylaminoethylamine, dimethylaminoneopentylamine or methoxypropylamine are used, the amine reacts with one or two epoxide groups, depending on the stoichiometric relations provided, the reaction being accompanied by an increase in molecular size.

Significant improvements in properties are surprisingly obtained if, according to the invention, resin molecules of component (A) have incorporated in them at least one molecule-enlarging diamine of the formula

wherein the symbol Y stands for H or $C_mH_{2m+1}(m=1$ to 8) or an organic group which is used for defuntionalisation, formed by reaction of the primary amino group with monoepoxides, and the symbol X represents a molecular grouping having at least one amide and/or urea group, these groups being bound to the nitrogen atoms of formula (I) by alkylene groups having 1 to 16 carbon atoms.

The diamine containing amide group is prepared by condensation of an aminocarboxylic acid with a primary diamine or of one mol of a dicarboxylic acid with two mols of diamine. The dicarboxylic acids used may be aliphatic linear or branch chained, cyclic or aromatic dicarboxylic acids or their anhydrides having a chain length of 2 to 36 carbon atoms, such as adipic acid, sebacic acid, cyclohexane dicarboxylic acid, isophthalic acid, tert.-butylisophthalic acid or dimeric fatty acids. The diamino alkanes used are mainly end-group diamines having two primary, two secondary or one primary and one secondary amino group and containing a linear or branch-chained, aliphatic or cycloaliphatic carbon chain with 2 to 16 carbon atoms, such as hexanediamine-(1,6), trimethylhexamethylene diamine or isophorone diamine (3-amino-methyl-3,5,5-trimethylcyclohexylamine), N-methyl-1,3-propanediamine, N,N'-diethyl1,4-butanediamine or N,N'-dimethyl-4,4'-diaminodicyclohexylmethane. Condensation is normally carried out in a solvent-free liquid phase or with azeotropic removal of the water split off at temperatures of about 130° to 240° C. Esterification is continued until the acid number of the product is below 1. The aminocarboxylic acids used may be glycine, alanine, phenylamine, sarcosine or pyrrolidine carboxylic acid.

The diamine containing urea group is prepared by the addition of diaminoalkanes such as those described in the previous section to polyisocyanates having at least two isocyanate groups. Thus two mols of primary or secondary diamine or one mol of primary or secondary monoamine and one mol of primary diamine may be reacted with one mol of diisocyanate. Typical isocyanates are the isomers and isomeric mixtures of tolylene diisocyanate, 4,4'-diphenylmethane diisocyanate, and their hydrogenation products, such as dicyclohexylmethane diisoctanate. Hexane-1,6-diisocyanate, 1,6-diisocyanato-2,2,4-trimethylhexane or isophorone diisocyanate may also be used. Mixed aliphatic-aromatic compounds are also suitable.

Preparation of the diamine containing urea is carried out in solvents which do not react with the isocyanate group, such as ethylene-diglycol-dimethyl ether, at about 20° to 40° C. by slow addition of the polyisocyanate to the excess, optionally defunctionalised diamine. A product of addition of tolylene diisocyanate to a reaction product of one mol of Cardura E (registered trademark) and one mol of hexane-1,6-diamine is preferred. The temperature is generally raised to 50°-125° C. to complete the reaction. If diaminoalkanes having a secondary and a primary amino group are used, it may be advisable to lower the reactivity of the primary amino group by ketimine formation or the reactivity of the isocyanate group by suitable protective groups.

When polyisocyanates containing more then two isocyanate groups are used, the number of isocyanate groups is reduced to two by means of a monoamine or monohydric alcohol to prevent gelling, and the usual reaction with diamines is then carried out. Products obtained by trimerisation, reaction with water or partial reaction with trifunctional polyols have proved to be suitable triisocyanates. Examples include the isocyanurate of hexamethylene diisocyanate, the biuret of hexamethylene diisocyanate and water, and the adduct of three mols of tolylene diisocyanate and one mol of trimethylol propane.

The molecule-enlarging diamines of formula (I) are thus incorporated in component (A) in a quantity of at least 8% by weight, calculated as compound of formula I and based on the total weight of component (A). The quantity is preferably at least 15% by weight, most preferably at least 20% by weight. The upper limit is not particularly critical and depends mainly on the overall structure of the molecule, i.e. the necessity for the presence of the other constituents mentioned above, bearing in mind the abovementioned average molar mass of 500 to 20,000. The upper limit is generally about 50% by weight, preferably about 40% by weight.

When compounds of formula (I) are incorporated in the molecules of component (A), addition of the amino groups of formula (I) to the epoxide groups normally takes place with enlargement of the molecule.

It is preferred according to the invention that all the amide and/or urea groups present in the molecules of component (A) should all together conform to formula (I).

To obtain linear basic resin molecules and prevent premature gelling, the reaction of the polyamine containing amide or urea groups with the resins containing epoxide groups is preferably carried out in such a manner that, in the case of secondary diamines, the amine or amine mixture is slowly added to the epoxide resin solution, whereas in the case of primary, or secondary and primary diamines the epoxide resin solution is slowly added to the amine mixture, in both cases at reaction temperatures of about 30° to 100° C. The stoichiometric ratios are preferably calculated to provide one reactive nitrogen atom for each epoxide group. By a reaction with monoepoxides such as ethylene oxide, propylene oxide, glycidol, glycidyl esters such as Cardura E (registered trademark) or glycidyl ethers such as glycidyl allyl ethers, primary amino groups may be converted into secondary amino groups at temperatures of about 70° to 150° C., if necessary under pressure. The polyamines containing amide or urea groups are preferably of the kind in which the hydrogen atoms on the amide or urea group are not substituted.

To introduce unsaturated groups into the basic resin (A), transetherification with a (meth)acrylamide containing methylol groups which are optionally etherified with C1 to C8 monohydric alcohols may be carried out at the end of the reaction of preparation of the compound. Thus, for example, the hydroxyl groups of the basic resin (A) may be reacted with methylol acrylamide monobutyl ether by several hours' heating at 80°–160° C., optionally with application of a vacuum.

The stoichiometric calculation and choice of the individual starting materials is carried out so that the basic resin (A) contains, on average, at least one amino group per molecule. The quantity of amine for the reaction with the resin containing epoxide groups is chosen to be at least sufficient to impart a cationic character to the resin after neutralisation with an acid. In some cases, substantially all the epoxide groups are reacted with amine. The lower limit for the amine number (expressed in mg KOH per gram of solid resin) is 35 although the number is advantageously above 50, preferably above 65. The upper limit is 150, preferably below 100, most preferably below 85. If the amine number is too low, the solubility is too low and the lacquer settles out when left to stand. The pH values of the baths become too acid due to the too high degree of neutralisation. If the amine number is too high, the coating formed will not adhere firmly. A blistering surface of irregular thickness is often observed due to excessive electrolytic evolution of gas.

The hydroxyl number in the molecule (expressed in mg KOH per gram of solid resin) determines the capacity of the film for cross-linking. It should be above 50, preferably above 100, most preferably above 150. The hydroxyl number should be at the most 400 and is preferably below 300. If the hydroxyl number is too low, transesterification results in films which are still soluble in organic solvents such as methylethyl ketone. If, on the other hand, the hydroxyl number is too high, the film obtained is too brittle and may also remain too hydrophilic. The molecule must contain at least two groups capable of cross-linking, preferably primary hydroxyl groups.

The basic resin (A) containing tertiary and optionally also secondary and primary amino groups has an average molar mass ($\overline{Mn}$) of about 500 to 20,000, in particular 1,000 to 5,000, and a $pK_b$ value of about 3 to 7. The $pK_b$ value is the negative decadic logarithm of the basic dissociation constant.

The cross-linking agent (B) is a resin with esterified carboxyl groups in end positions or side chain positions which are substantially stable in neutral, aqueous media but in the alkaline medium of the deposited film they react with one or more than one hydroxyl group-containing amino epoxide resin (basic resin (A)) at temperatures above ca. 140° C. Substantially all the carboxyl groups in end positions or side chain positions should be esterified with alcohols which are volatile under the stoving conditions. To prevent migration of the cross-linking agent (B) to the anode, care should be taken to ensure that component (B) has an acid number below 20, preferably below 10 and most preferably below 4. The cross-linking agent has an average molar mass ($\overline{Mn}$) of about 350 to 5,000, in particular 500 to 3,000. The reactivity of the esters is increased by using primary alcohols such as methanol or ethanol and by increasing the electrophilic acitivity of the carboxyl group by suitable substituents. The lower the molecular weight of the alcohols split off in the ester interchange reaction, the lower are the losses occurring in this reaction. Cross-linking agents of this type described in the literature may be used, e.g. monohydric alcohols having 1 to 8 carbon atoms.

Numerous cross-linking agents capable of transesterification reactions with OH groups or transamidation reactions with $NH_2$ groups are described in the literature, e.g. as follows:

Polyurethanes containing hydroxyalkyl esters such as lactic acid esters or aminoalkyl esters such as esters of sarcosine as groups capable of transesterification are described in EP-A-0 040 090. The cross-linking agent may have, say, the following general structure:

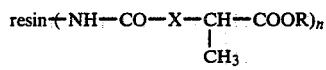

where n has a value of at least 2, preferably a value from 3 to 10, X denotes either O or NH, and R denotes a straight chained or branched, saturated or unsaturated alkyl group with 1 to 8 carbon atoms, preferably methanol or ethanol. If the cross-linking agent is a reaction product of an isocyanate with a compound containing a carboxylic acid ester group, it is preferably an addition product of hydroxycarboxylic acid alkyl esters with resins having isocyanate groups.

Examples of such cross-linking agents include polyesters containing carboxyl groups, which groups are blocked by optionally substituted 1,2-glycols to form β-hydroxyl compounds:

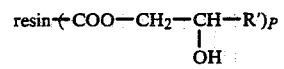

The 1,2-glycols used are preferably substituted with saturated or unsaturated alkyl, ether, ester or amide groups, i.e. R' stands for

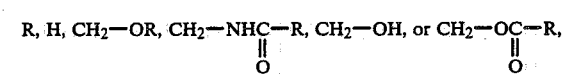

and P is a value from 2 to 8. R is an alkyl group having 1 to 8 carbon atoms.

Cross-linking agents of this type have been described in EP-A-012 463 and DE-A-3 103 642, e.g. as a reaction product of trimellitic acid anhydride with Cardura E ®, the glycidyl ester of versatic acid.

Another cross-linking agent is prepared by transesterification of dicarboxylic acid alkyl esters with polyhydric alcohols. Resins corresponding to the following formula are particularly reactive:

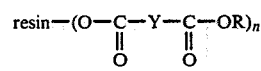

where n has a value of at least 2, preferably 3 to 10, Y is a $CH_2$, $CH_2CH_2$ or $CH=CH$ group and R is a straight chained or branched alkyl group having 1 to 8 carbon atoms, preferably methanol or ethanol. In the simplest case, this cross-linking agent is a reaction product of trimethylol propane and diethyl malonate, as described in EP-A-082 291.

Another cross-linking agent capable of transesterification may be obtained by Michael addition of an alkyl ester of acetoacetic acid or of a dialkyl ester of malonic acid to resins having unsaturated double bonds activated by $C=O$ groups:

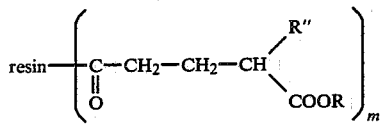

where R" stands for COOR or CO-R and m is a value from 2 to 8. These resins are prepared in the simplest case from butane diol diacrylate and ethyl acetoacetate. The urethane of tolylene diisocyanate and hydroxyalkyl (meth) acrylate, which is reacted with diethyl malonate as described in DE-A-3 315 469, is preferred.

The proportions in which components (A) and (B) are mixed may vary within wide limits in the coating compound, but are preferably within the range of from 80:20 to 60:40, and the proportions to be used are determined empirically from the optimum characteristics obtainable at the given stoving temperature. A combination of several crosslinking systems may be advantageous in certain cases. Even a few percent, e.g. 0.5 to 5.0% by weight of the cross-linking component described in the second place may decisively reduce the susceptibility to crater formation in the third cross-linking agent. The components may be mixed cold or precondensed at elevated temperature. Components (A) and (B) then react together to a certain extent without the mixture losing its capacity to be heat cured or its capacity to be rendered water soluble by protonation with acids.

The conventional transesterification catalysts used (component C) advantageously consist of 0.1 to 10% by weight, preferably 2 to 6% by weight (based on components (A) and (B)), of metal oxides, metal salts or metal complexes of monovalent or higher valent metals. They are generally dissolved in aliphatic or aromatic hydrocarbons after salt formation with 2-ethylhexanoic acid or naphthenic acid. These solutions are emulsified in the electrophoresis bath. Complex formation of the metal with acetyl acetonate, dicyclopentadiene or 8-hydroxyquinoline is another possibility.

Examples of suitable catalysts are: antimony trioxide, cobalt naphthenate, lead octoate, iron acetyl acetonate, the reaction product of zinc oxide and 8-hydroxyquinoline, thallium dicyclopentadiene and triethanolamine titanate. Lead octoate and zinc oxyhydroquinoline are preferred. The metals may also be incorporated in a finely dispersed form as pigments such as lead silicate. Water soluble metal salts are also suitable as transesterification catalysts if the metal is deposited as compound or complex in a finely divided form together with the lacquer. Catalysts which are difficultly soluble in the electrodeposition bath and become uniformly distributed in the deposited film during stoving after electrophoresis are preferred.

The cationic basic resin is rendered capable of dilution with water by protonation with acids in known manner. Examples of suitable acids include formic acid, acetic acid, propionic acid, lactic acid, citric acid, malonic acid, acrylic acid, aminoacetic acid, phosphoric acid and alkyl phosphoric acids. The acid must be added at least in sufficient quantity to bring about solution of the cationic basic resin. An excess of acid, i.e. a degree of neutralisation above 100%, should preferably be avoided. The MEQ value (milli-equivalents of acid per 100 g of solid resin) is generally in the region of from 20 to 80.

The coating compound may in addition contain the usual additives used in lacquer technology, such as anti-pitting agents, levelling agents, antifoamants, etc. The acids should, of course, be selected so that they do not undergo unwanted reactions with water at acid to neutral pH values, do not introduce foreign ions and do not, when left to stand, precipitate in a form which cannot be stirred up again, i.e. the coating compound must be capable of being converted again into a stirrable dispersion even after it has been left to stand for a considerable time.

The coating compound may contain up to about 20% by weight of organic solvents to lower the viscosity, control the voltage at which deposition takes place, and improve adherence and levelling of the deposit. It is desirable to keep the organic solvent content as low as possible, especially below 15% by weight and most preferably below 10% by weight. The solvents used may be alcohols, glycol ethers, ketoalcohols, optionally with the addition of aliphatic or aromatic hydrocarbons of different chain lengths. When choosing a solvent, it should be borne in mind that component (B) is not water soluble and proportions of water insoluble solvents may facilitate and stabilise the dispersion process. The all round grip deteriorates with increasing solvent content and excessive coating may occur; with decreasing solvent content, on the other hand, the thickness of the deposited coating also decreases. Water insoluble solvents have a more powerful effect in this respect than water soluble solvents. The aprotic solvents required for preparing component (A) may optionally be replaced by other solvents by distilling off the aprotic solvents after the product has been prepared.

The solids content of the coating compound according to the invention is suitably from 5 to 50% by weight after dilution with water. If the lacquer is adjusted to a relatively high solids content, say from 25 to 50% by weight, preferably from 30 to 45% by weight, the stoving lacquers obtained can be diluted with water and applied to the object to be lacquered by immersion, spraying, roller application, etc. If the lacquer is diluted to a solids content of from 5 to 30% by weight, preferably 10 to 20% by weight, then it is suitable for electrophoretic deposition. The bath is stirred constantly to maintain a uniform temperature on the cathod surface and prevent deposition of the insoluble constituents of the dispersion, e.g. pigments. The binder is rendered "water soluble" by protonation in a manner known in this technical field. This means that it is dispersed in a very finely divided form so that precipitation does not occur. This is often described in the literature as "water dilutable". The pH of the lacquer is generally from 5.0 to 7.0, preferably from 5.5 to 6.5. If the pH is too low, the acid is liable to attack the iron of tanks and pipes.

Electrophoretic deposition should preferably not be carried out earlier than 24 hours after preparation of the bath. During this time, continuous stirring is advisable to ensure uniform distribution. The anodes used are electrically conductive, non-corrosive electrodes, e.g. of stainless steel or graphite. Both the article which is to be coated at the cathode and the anode are immersed in an aqueous bath, as is known for electrophoretic deposition. Any metallically conductive workpieces may be coated, e.g. pieces made of copper, aluminium, tin, zinc, iron or alloys of these metals. The bath is suitably kept at about 15° to 35° C. during deposition. The temperature and time of solids deposition and the voltages are chosen to that the desired thickness of the deposited layer is obtained after rinsing with water and stoving at object temperatures of about 160° to 200° C. Thus, for example, the layer thickness increases with increasing coating time and deposition voltage. If an electric current is applied at a voltage of, suitably, 50 to 500 volt between a metallically conductive workpiece and a counter electrode, the water dilutable basic resin coagulates at the cathode, carrying the water insoluble crosslinking agent, pigment, catalysts, etc. with it. In this process, the proportion of pigment to synthetic resin binder in the deposited film may shift in favour of the pigment. At the same time, water and the acid used for neutralisation accumulate in the bath. Concentrated lacquer must therefore be used for refilling the bath to compensate for this shift by changing the quantitative proportions. This correction may also be achieved by means of suitable apparatus such as, for example, those used for electrodialysis.

The concentrated binder according to the invention which is to be diluted with water may be pigmented in the usual manner, e.g. with a solids content of 85 to 50% by weight, in a ball mill, three-roller mill or sand mill. The usual pigments, fillers, corrosion inhibitors and lacquer auxiliaries may be used for this purpose, provided they do not enter into any unwanted reactions with water in an acid to neutral medium, do not introduce any water soluble foreign ions and do not, in the course of aging, precipitate in such a form that they cannot be stirred up again. The lacquers are particularly suitable for the electrodip lacquering of metals and give rise, after stoving at 180° C. for 30 minutes, to smooth, glossy, hard films with good adherence, elasticity and corrosion resistance. The pigment-binder ratio depends on the dispersibility and viscosity of the binder and is generally in the range of from 0.1:1 to 1.5:1.

Preliminary product I (diamine containing urea groups)

190 g of hexanediamine-(1,6) are heated to 100° C. under inert gas, and 833 Cardura E (registered trademark) are added in the course of three hours. The exothermic reaction is maintained at 100 to 110° C. with cooling. The reaction mixture is stirred for 4 hours, then cooled to 40°–50° C., and 168 g of trimethyl-hexamethylenediisocyanate are slowly added dropwise over a period of 2 hours. The temperature is then maintained at 60° C. for one hour and 80° C. for a further hour. No free NCO could be detected at this stage, and the reaction mixture was then diluted to 90% by weight with ethyleneglycol monoethyl ether.

Preliminary product II (diamine containing amide groups)

178.5 g of hexanediamine-(1,6) and 431.3 g of a dimeric fatty acid composed of traces of monomers, about 80% of dimers and 20% of trimers are continuously heated to about 155°–220° C., water being continuously split off in the process. Condensation is completed when the acid number is 0.5 mg KOH/g of solid resin. After cooling to 105° C., 390 g of Cardura E (registered trademark) are slowly added over a period of about 2 hours and the reaction mixture is kept at this temperature for 3 hours.

Amine number: 83 mg KOH/g of solid resin.

Preliminary product III (diamine containing urea groups)

644 g Cardura E (registered trademark) are introduced dropwise into 295 g of hexanediamine-(1,6) at 100° C. and the reaction mixture is cooled to 25° C. after dilution with 800 g anhydrous methylisobutyl ketone. 260 g of an isomeric tolylene diisocyanate mixture are added very slowly, dropwise, at 25°–30° C. over a period of 6 hours with vigorous cooling. After a further two hours, the reaction mixture is heated to 50°–60° C. to complete the reaction, and the solvent is distilled off under vacuum.

Solids content: 91.8% by weight (1 hour, 150° C.).

Basic resin A1

438.6 g of an epoxide resin based on bisphenol A having an epoxide equivalent weight of 465 are dissolved in 248 g of ethyleneglycol monoethylether at 55° C. 31.8 g of diethanolamine are then added dropwise in the course of about 15 minutes, the temperature rising to about 60° C. One hour later, a mixture of 265.8 g of preliminary product I and 15.4 g of dimethyl-aminopropanolamine is added in the course of 5 minutes. After one hour, the reaction temperature is kept at 85°–90° C. for one hour and then at 120° C. for a further hour.

| Final values: | |
| --- | --- |
| solids content: | 67.6% by weight (after 40 minutes' heating to 180° C.) |
| viscosity: | 2.2 Pas (after dilution to 50% by weight with ethylene glycol monoethylether) |
| amine number: | 81 mg KOH/g of solid resin. |

Basic resin A2

2172 g of an epoxide resin based on bisphenol A having an epoxide equivalent weight of 480 are dissolved in 1160 g of ethyleneglycol monoethylether at about 50° C. 191.6 g of diethanolamine are then added dropwise in the course of about 15 minutes, the temperature rising to 62° C. during this addition in spite of cooling. After about one and a half hours, 417.2 g of preliminary product II followed by a mixture of 21.6 g of ethylene glycol monoethyl ether and 43.2 g of N,N-diethyl-1,2-ethanediamine are added in the course of about 20 minutes. The reaction mixture is heated to about 80° C. after one hour and kept at this temperature for one hour, and the temperature is then raised to 120° C. The reaction is completed after one hour and the reaction mixture may be cooled and filtered.

| Final values: | |
| --- | --- |
| solids content: | 72% by weight |
| viscosity: | 6.7 Pas (50/50 in ethylene glycol monoethyl ether) |
| amine number: | 62 mg KOH/g of solid resin. |

Basic resin A3

2172 g of an epoxide resin as in basic resin A2 are dissolved in 1160 g of ethyleneglycol monoethylether at about 50° C. 191.6 g of diethanolamine are added dropwise in the course of about 15 minutes and the rising temperature is kept down to a maximum of 54° C. with cooling. After about one-and-a-half hours, a mixture of 404 g of preliminary product III, 26.4 g of ethyleneglycol monoethyl ether and 46.4 g of dimethylaminopropanolamine is added. The reaction mixture is then worked up as in experiment A2.

| Final values: | |
|---|---|
| solids content: | 71.7% by weight |
| viscosity: | 1.8 Pas (50/50 in ethylene glycol monoethylether) |
| amine number: | 70 mg KOH/g of solid resin. |

Cross-linking agent B1

1248 g of Cardura E (registered trademark) are heated to 100° C. under inert gas and 460.8 g of trimellitic acid anhydride added in several portions with vigorous stirring. Making use of the exothermic reaction, the reaction mixture is heated to 195° C. When the resin is clear, it is cooled to 145° C. and 1.8 ml of benzyl dimethylamine are added as catalyst. When an acid number corresponding to 2 mg KOH/g of solid resin is obtained, the reaction mixture is cooled to 100° C. and diluted with 712 g of ethyleneglycol monobutyl ether.

| Final values: | |
|---|---|
| Solids content: | 67.5% by weight (after 40 minutes' heating to 180° C.) |
| viscosity: | 0.9 Pas (after dilution to 50% by weight with ethylene glycol monobutyl ether) |
| acid number: | 2.3 mg KOH/g of solid resin. |

Cross-linking agent B2

A mixture of 108 g of hydroxyethyl acrylate, 81.8 g of a mixture of 2,4- and 2,6-tolylene diisocyanate, 3 drops of triethylamine and 21 g of diethyleneglycol dimethylether is heated to 60° C. for 5 hours. 1 g of potassium hydroxide solution (30% in methanol) and 128 g of diethyl malonate are then added and the mixture is heated in a second stage to 120° C. for 6 hours. The proportion of double bonds is less than 0.2%. The reaction mixture is then diluted to a solids content of 90% by weight with ethyleneglycol monoethyl ether. A highly viscous clear liquid with a medium to intense yellow colour is obtained.

EXAMPLE 1

236 g of basic resin A1 are mixed with 59.2 g of cross-linking agent B1 and 1.3 g of iorn-III-acetylacetonate, then partially neutralised with 6 g acetic acid and slowly diluted to 2 liters with deionised water.

Bath data: see Table 1.

Lacquer films are deposited on zinc-phosphated steel sheets from the cathodic dip lacquering bath at the cathode, rinsed with water and cured at elevated temperature (20 minutes 180° C. object temperature).

EXAMPLE 2

331.5 g of basic resin A2 are mixed with 62.3 g of cross-linking agent B2, 4.4 g of cross-linking agent B1 and 5.8 g of lead octoate (72%), then partially neutralised with 13.5 g of lactic acid and slowly diluted to 2 liters with deionised water.

Bath data: see Table 1.

Lacquer films are deposited from the cathodic dip lacquering bath on zinc-phosphated steel sheets at the cathode, rinsed with water and cured at elevated temperature (15 minutes, 175° C. object temperature).

EXAMPLE 3

223 g of basic resin A3 are mixed with 59 g of cross-linking agent B1 and 6 g of lead octoate (72%), then partly neutralised with 4.1 g formic acid and slowly diluted to 2 liters with deionised water.

Bath data: see Table 1.

Deposition as in Example 2.

Comparison basic resin (according to EP-A-0 012 463 Example Ib)

21 g diethanolamine, 10.2 g of 3-(N,N-dimethylamino)propylamineand 61.6 g of an adduct of 1,6-diaminohexane and Cardura E 10 ®, a glycidyl ester of versatic acid ®, are added to a solution of 283.2 g of polyglycidyl ether based on bisphenol A with an epoxy equivalent weight of 472 (Epikote 1001 ®) in 161 g of ethyleneglycol monobutyl ether. The aforesaid adduct is prepared by the reaction of 116 g of 1,6-diaminohexane and 500 g CarduraE 10° at 880° C. for three hours. The mixture of polyethers and amines reacts when heated to 85°–90° C. for 4 hours with stirring. The mixture is finally heated to 120° C. for one hour to complete the reaction. The epoxide content is then zero. Amine number: 89 mg KOH/g of solid resin, solids content: 70.4% by weight.

COMPARISON EXAMPLE 219 g of comparison basic resin are mixed with 59 g of cross-linking agent B1 and 6 g of lead octoate ( 72%), then partly neutralied with 4.1 g of formic acid and slowly diluted to 2 liters with deionised water.

TABLE 1

| | Comparison | Example 1 | Example 2 | Example 3 |
|---|---|---|---|---|
| Solids content | 10% by weight | 10% by weight | 15% by weight | 10% by weight |
| Specific conductivity | 1630 $\mu Scm^{-1}$ | 1324 | 864 | 1230 |
| $MEQ_s$ value | 45 | 50 | 40 | 45 |
| pH | 5.6 | 5.9 | 5.7 | 5.7 |
| deposition voltage | 2 min 240 V | 2 min 190 V | 2 min 160 V | 2 min 210 V |
| layer thickness | 15–16 $\mu$m | 20 $\mu$m | 23 $\mu$m | 21 $\mu$m |
| Erichsen cupping | 6.1 mm | 8.7 mm | 9.3 mm | 8.3 mm |
| Konig pendulum hardness | 195" | 192" | 165" | 202" |
| Surface | smooth, no flow defects | smooth, glossy | smooth, glossy | smooth, no flow defects |

For the stone chipping test and test for PVC adherence, the individual binders were used to prepare a grey pigmentation of titanium dioxide (rutile) and a certain amount of carbon black in a pigment-binder ratio of from 0.5 to 1. The lacquer was catalysed with lead silicate and lead octoate in a quantity of 2.5% by weight, calculated as lead and based on the solids content of the binder.

The stone chipping test was carried out according to DIN 55 995, using an adjusted combination of lacquer coats as used for mass production by various car manufacturing companies. Both the monostone chipping test and the multistone chipping test were used, and both the amount of chipping between filler and electrodip primer and the amount of chipping between primer and phosphated sheet metal were assessed. The chipping in Examples 1 to 3 was about half that found in the comparison material.

To measure PVC adherence, the stoved electrodip primer was sprayed with a thick layer of PVC organosol which had been suitably adjusted to it, and the filler was gelled by heat. After exposure to the usual corrosion-protection tests, the samples were tested to ascertain whether the PVC coating could be stripped off the underlying layer and, if so, what force was required for stripping it. Examples 1 to 3 showed improvements with various PVC trade products compared with the comparison examples.

We claim:

1. Aqueous electrodip lacquer coating compound capable of being deposited at the cathode, containing pigments, fillers, corrosion inhibitors, lacquer auxiliaries, and, in a quantity of up to 20% by weight, based on the total weight of coating compound, organic solvents, and the following synthetic resin binder:
   (A) 55 to 95% by weight, based on the total quantity of synthetic resin binder, of a synthetic resin binder containing hydroxyl groups and tertiary amino groups and having an average molar weight ($\overline{M}n$) of 500 to 20,000, a $pK_b$ value of 3 to 7 and a hydroxyl number of 50 to 400 and an amine number of 30 to 150, which binder can be rendered water soluble by protonation with acid, and
   (B) 5 to 45% by weight of a cross-linking agent containing ester groups capable of transesterification or transamidation and having an average molar weight ($\overline{M}n$) of 350 to 5,000, an ester number of terminal reactive ester groups of 30 to 500, the ester groups being substantially stable in a neutral aqueous medium but capable of reacting with hydroxyl groups of synthetic resin binder (A) in an alkaline medium at temperatures above 140° C., wherein component (A) contains, in a quantity of at least 8% by weight, calculated as compounds of formula I and based on the total weight of component (A), at least one molecule-enlarging diamine corresponding to the formula:

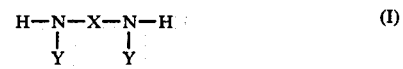

wherein the symbol Y stands for H or $C_mH_{2m+1}$ (m=1 to 8) or an organic group used for defunctionalisation, formed by reaction of the primary amino group with monoepoxides, and the symbol X represents a molecular grouping containing at least one amide or urea group, the grouping X being attached to the nitrogen atoms of formula (I) through alkylene groups having 1 to 16 carbon atoms.

2. Coating compound according to claim 1, characterised in that the diamines of formula (I) contain at least two urea groups.

3. Coating compound according to claim 1, characterised in that in formula (I), the symbol Y stands for the group $CH_2-CHOH-CH_2R^4$, wherein $R^4$ is a hydroxyl, ether (-O-alkyl-) or ester (-OOC-alkyl) group in which the alkyl moiety contains 1 to 18 carbon atoms.

4. Coating compound according to claim 1, characterised in that in formula (I), the symbol Y stands for the group $-CH_2-CHOH-R^5$ wherein $R^5$ is a hydrogen atom or an alkyl group with 1 to 18 carbon atoms.

5. Coating compound according to claim 1, wherein the coating compound further comprises a catalyst.

6. Coating compound according to claim 1, wherein binder component (A) further contains primary amino groups, secondary amino groups, or primary and secondary amino groups.

7. Coating compound according to claim 6, wherein the ester groups of component (B) are capable of reacting with said primary or secondary amino groups of binder component (A) in an alkaline medium at temperatures above 140° C.

8. Coating compound according to claim 1, wherein said cross-linking agent has an ester number of terminal reactive ester groups of 100 to 250.

* * * * *